US011404944B2

(12) United States Patent
Lee et al.

(10) Patent No.: US 11,404,944 B2
(45) Date of Patent: Aug. 2, 2022

(54) METHOD FOR MANUFACTURING MSO COIL AND DEVICE FOR MANUFACTURING SAME

(71) Applicant: KOREA INSTITUTE OF INDUSTRIAL TECHNOLOGY, Seoul (KR)

(72) Inventors: Eui Chun Lee, Gumi-si (KR); Soon O Kwon, Daegu (KR); Ho Young Lee, Daegu (KR); Su Woong Lee, Daegu (KR); Kang Won Lee, Cheonan-si (KR)

(73) Assignee: KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 539 days.

(21) Appl. No.: 16/466,530

(22) PCT Filed: Dec. 1, 2017

(86) PCT No.: PCT/KR2017/014003
§ 371 (c)(1),
(2) Date: Jun. 4, 2019

(87) PCT Pub. No.: WO2018/105958
PCT Pub. Date: Jun. 14, 2018

(65) Prior Publication Data
US 2020/0099279 A1    Mar. 26, 2020

(30) Foreign Application Priority Data

Dec. 5, 2016   (KR) .................. 10-2016-0164319

(51) Int. Cl.
*H01F 7/06*    (2006.01)
*H02K 15/04*   (2006.01)
(Continued)

(52) U.S. Cl.
CPC ......... *H02K 15/04* (2013.01); *H01F 27/2847* (2013.01); *H02K 15/0025* (2013.01); *H02K 15/0407* (2013.01)

(58) Field of Classification Search
CPC .. H01F 41/061; H01F 41/077; H01F 27/2847; H02K 15/04; H02K 15/0414
See application file for complete search history.

(56) References Cited

U.S. PATENT DOCUMENTS 6,269,531 B1 * 8/2001 Mercado ............. H01F 27/2847
29/602.1
2007/0220743 A1 * 9/2007 Tsukamoto .......... B23K 11/002
29/831

FOREIGN PATENT DOCUMENTS

JP    2003259610 A    9/2003
JP    2005130676 A    5/2005
(Continued)

OTHER PUBLICATIONS

International Search Report dated Mar. 9, 2018 for PCT/KR2017/014003.

*Primary Examiner* — Paul D Kim
(74) *Attorney, Agent, or Firm* — Cantor Colburn LLP

(57) ABSTRACT

Disclosed is a method for manufacturing an MSO coil, comprising: a pressing step of forming a bent surface on a part of a unit coil layer, which has a ring shape such that both ends thereof face each other, thereby endowing both ends of the unit coil layer with a height difference; a fixing step of connecting and fixing a plurality of unit coil layers to each other, each unit coil layer having the bent surface formed thereon, such that the first end of both ends of a unit coil layer having the bent surface formed thereon contacts the second end of both ends of another unit coil layer having the bent surface formed thereon; and a bonding step of bonding connection parts defined by contact of the first and second (Continued)

ends of each of the plurality of unit coil layers that are connected and fixed to each other.

11 Claims, 15 Drawing Sheets

(51) Int. Cl.
*H01F 27/28* (2006.01)
*H02K 15/00* (2006.01)

(56) References Cited

FOREIGN PATENT DOCUMENTS

| KR | 200387589 Y1 | 6/2005 |
| KR | 101325931 B1 | 11/2013 |
| KR | 1020160059527 A | 5/2016 |

\* cited by examiner

METHOD FOR MANUFACTURING MSO COIL AND DEVICE FOR MANUFACTURING SAME

TECHNICAL FIELD

The present invention relates to a method for manufacturing an MSO coil and a device for manufacturing the same, and more particularly, to a method for manufacturing an MSO coil, in which the MSO coil has a comparatively high coil space factor with respect to the same structure and a uniform electric resistance per each turn of a coil that forms a coil layer so that it not only has low heat generation, high efficiency, and high performance, but also is easy to assemble with a rotor and a stator and thus has excellent product rate, and a device for manufacturing the same.

BACKGROUND ART

Today, studies on the efficiency improvement of electric motors have been actively progressed, and improving the efficiency of electric motors and generators used for electric vehicles and power generation facilities can cause a great economic effect and thus the attention thereto is especially high.

Accordingly, as a way to improve the efficiency of electric motors and generators, various ways to improve the space factor of the coil wound around the rotor or the stator are studied.

As a general way to improve the space factor of the conventional coil, a method for increasing the diameter of the coil wound around the stator or the rotor, or increasing the number of wound has been mainly used.

However, in the case of a conventional coil, since a wire having a circular vertical cross section is commonly used, if the diameter of the circular coil is increased for high efficiency and high output, since a waste space due to the circular cross sectional shape is generated between the wound coil layers, there has been a fundamental problem that the space factor of the coil is lowered.

On the other hand, when the coil having a too small diameter was wound, it could cause the problem of efficiency reduction and heat generation due to an increase of comparative electrical resistance.

In addition, since the conventional electric motors and generators are manufactured by using the method of winding coils around the cores of the stator and the rotor, there has been an additional problem that production volume is limited due to long manufacturing times, and thus the manufacturing difficulty and costs are increased.

To solve the above problems, the Maximum Slot Occupy (MSO) coil was developed. However, to maximize the space factor in the core, the MSO coil was forced to use an electro discharge machining and a mechanical machining method due to its special shape such as having a per shape and forming a large cross-sectional area of a coil side.

For example, when the MSO coil is manufactured by using a method such as winding, since the tissue density of inside and outside structures of the coil to be bent becomes different due to the special shape of a coil layer formed with a large cross sectional area, a problem that uniformity at current density and durability thereof can be problematic has existed.

However, when the MSO coil is manufactured by using an electro discharge machining and a mechanical machining method, there has been a problem that the productivity is low due to high unit cost because it takes long time to manufacture the MSO coil.

Particularly, as a coil having a wide cross-sectional area is manufactured through an electro discharge machining and a mechanical machining method, opportunity costs for times and materials wasted by a cutting process could not be ignored.

Therefore, it is now required to develop the technology for manufacturing armature coils and motors that can improve the production speed of finished products of motor, and further can have higher production speed compared with traditional mechanical cutting methods such as conventional electro discharge machining.

If the technology that can improve the efficiency and productivity at the same time is developed, especially in the field of electric vehicles, the effect on the related industry is expected to be great.

DISCLOSURE

Technical Problem

It is an object of the present invention to provide a method for manufacturing an MSO coil, in which the MSO coil has a comparatively high coil space factor with respect to the same structure and a uniform electric resistance per each turn of a coil that forms a coil layer, so that it not only has low heat generation, high efficiency, and high performance, but also is easy to assemble with a rotor and a stator and thus has excellent productivity, and a device for manufacturing the same.

Meanwhile, it may be understood that the technical problem of the present invention is not limited to the technical problem described above, and other technical problems not mentioned may be clearly understood from the following descriptions by those skilled in the art to which the present invention pertains.

Technical Solution

To solve the above problems, according to one aspect of the present invention, there is provided a method for manufacturing an MSO coil, which may include: a pressing step of forming a bent surface on a part of a unit coil layer, which has a ring shape such that both ends thereof face each other, thereby endowing both ends of the unit coil layer with a height difference; a fixing step of connecting and fixing a plurality of unit coil layers to each other, each unit coil layer having the bent surface formed thereon, such that one end of both ends of a unit coil layer having the bent surface formed thereon contacts the other end of both ends of another unit coil layer having the bent surface formed thereon; and a bonding step of bonding connection parts where one end and the other end of each of a plurality of unit coil layers that are connected and fixed to each other are in contact.

Here, the method for manufacturing an MSO coil may further include a coupling structure forming step wherein when any one unit coil layer of a plurality of unit coil layers, on which the bent surface is formed, is referred to as a first coil layer, and another unit coil layer having the other end connected with one end of the first coil layer is referred to as a second coil layer, the coupling structure is configured by including grooves and protrusions which are male/female-coupled, which are provided on one end of the first coil layer and the other end of the second coil layer, respectively so that one end of the first coil layer and the other end of the second coil layer in contact are fitted and coupled to each other.

The coupling structure forming step described above may include: forming a first groove in which a vertical cross section of the remaining part along a longitudinal direction at one end of the first coil layer other than the one part is recessed so as to form a first protrusion wherefrom one part at the one end of the first coil layer protrudes; and forming a second groove in which a vertical cross section of the remaining part along a longitudinal direction at the other end of the second coil layer other than the one part is recessed so as to form a second protrusion where one part at the other end of the second coil layer protrudes, wherein the coupling structure may be provided such that the first protrusion at one end of the first coil layer is fitted into the second groove at the other end of the second coil layer, and the second protrusion at the other end of the second coil layer can be fitted into the first groove at one end of the first coil layer, which are corresponding with each other.

In addition, in the coupling structure forming step, when another unit coil layer having the other end connected with one end of the second coil layer is referred to as a third coil layer, a coupling structure formed at one end of the second coil layer and the other end of the third coil layer, respectively, may be formed to be disposed at a position deviated from the same line as a coupling structure formed at one end of the first coil layer and the other end of the second coil layer, respectively.

Meanwhile, in the bonding step, the coupling structures of the first coil layer and the second coil layer may be bonded to each other by facing and pressing an electrode to the connection part at which one end of the first coil layer and the other end of the second coil layer are female and male coupled through the coupling structure, and flowing an electric current to the coupling part.

At this time, in the bonding step, connection parts of the plurality of unit coil layers connected to each other through the coupling structure may be bonded by making the grooves and the protrusions of the coupling structure into a half-molten state by using a resistance heat generated when flowing an electric current to the connection part and integrally pressing the connection parts of the plurality of unit coil layers including the first coil layer and the second coil layer.

Also, in the bonding step, the electrode may press a width direction of connection parts of the first coil layer and the second coil layer, and may press a thickness direction of the connection parts by applying an external force when flowing an electric current to the connection parts through the electrode.

In addition, in the bonding step, an applying direction of an external force for pressing the connection parts may be coincident with the insertion direction of the groove and the protrusion having the coupling structure, and the protrusion inserted into the groove by an external force applied to the connection parts may be preferentially melted locally and bonded.

According to another aspect of the present invention, there is provided a device for manufacturing used in the method for manufacturing an MSO coil, which may include: a press jig having a surface on which the unit coil layer is placed, a part of the surface being recessed/formed to have a preset inclination to correspond to a part of the unit coil layer, on which the bent surface is to be formed, such that, when pressure is applied to the unit coil layer by external force, the bent surface is formed on the part of the unit coil layer; a fixing jig inserted between the plurality of unit coil layers, respectively, so as to support the plurality of unit coil layers such that the plurality of unit coil layers, each unit coil layer having the bent surface formed thereon, can be connected to each other at an interval corresponding to the inclination of the bent surface; and a welding machine for welding connection parts where one end and the other end of each of the plurality of unit coil layers are connected and fixed to each other by the fixing jig.

Here, the press jig may include a first press jig on which a part including one end of both ends of the unit coil layer is laid and fixed and a second press jig on which another part including the other end of both ends of the unit coil layer is laid and fixed, wherein the second press jig may include a slope line provided as a groove having an inclination and forming a bent surface at a predetermined angle at another part including the other end of both ends of the unit coil layer when a pressure is applied to the unit coil layer by an external force; and a plain line of bending the other end of the unit col layer from the bent surface once more when a pressure is applied to the unit coil layer by an external force so that the other end of the unit coil layer has height difference from, but is parallel to the one end of the unit coil layer.

The fixing jig may include: a fixing pin that is provided as a pair and is inserted into the annular unit coil layer in a spaced relationship to fix the unit coil layer; a plurality of spacers inserted between the plurality of unit coil layers, respectively, each of the plurality of spacers having a thickness equal to the height difference between both ends of the unit coil layer by the bent surfaces; a first fixing jig to which one side of the plurality of spacers is inserted and fixed; and a second fixing jig to which the other side of the plurality of spacers is inserted and fixed.

In this case, the first fixing jig may include: a face piece for touching and fixing the bent surface of the uppermost unit coil layer of the plurality of unit coil layers; and an end groove which is opened along one side of the face piece, into which an extending portion formed by extending one end or the other end of the unit coil layer located at the uppermost unit coil layer of the plurality of unit coil layers in a straight line shape, is inserted and fixed.

In addition, the MSO coil manufactured by a method for manufacturing an MSO coil according to the present invention may form a coil block in which the plurality of unit coil layers are continuously stacked along a vertical direction, and the coil block is configured such that a width of a vertical cross section of the unit coil layer increases and a thickness thereof decreases as going from the lower part to the upper part, and thus all the vertical cross-sectional areas along the vertical direction of the plurality of unit coil layers are formed identically.

Advantageous Effects

According to the method and the device for manufacturing an MSO coil of the present invention having the above-described configuration, the following effects can be obtained.

First, the MSO coil can be manufactured with lower production costs and higher production speeds compared with conventional electro discharge machining and machining methods.

Meanwhile, the effects of the present invention are not limited to the effects mentioned above, and other effects not mentioned can be clearly understood from the description of the claims by those skilled in the art to which the present invention pertains.

BEST MODE

Figure 1:
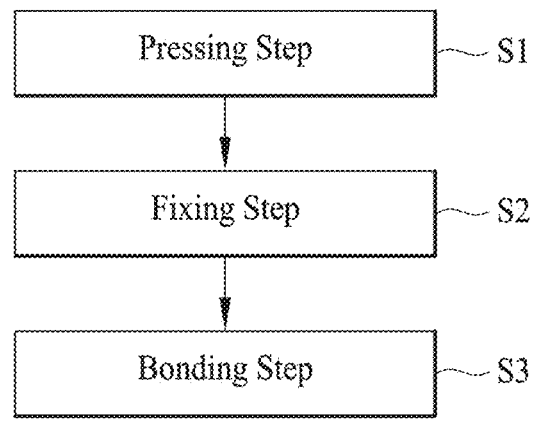
FIG. 1 is a flowchart illustrating a method of manufacturing an MSO coil according to the present invention.

Hereinafter, an embodiment of the present invention will be described in detail with reference to the accompanying drawings. In the description of the embodiment, the same configurations are denoted by the same term and mark and additional descriptions thereof will be omitted.

In describing the embodiment of the present invention, the configuration illustrated in the drawings is only an example to help understanding the detailed description, and does not limit the claims.

First, as illustrated in FIG. 1, a method for manufacturing an MSO (Maximum Slot Occupy) coil according to an embodiment of the present invention may include a pressing step (S1), a fixing step (S2), and a bonding step (S3).

Figure 2:
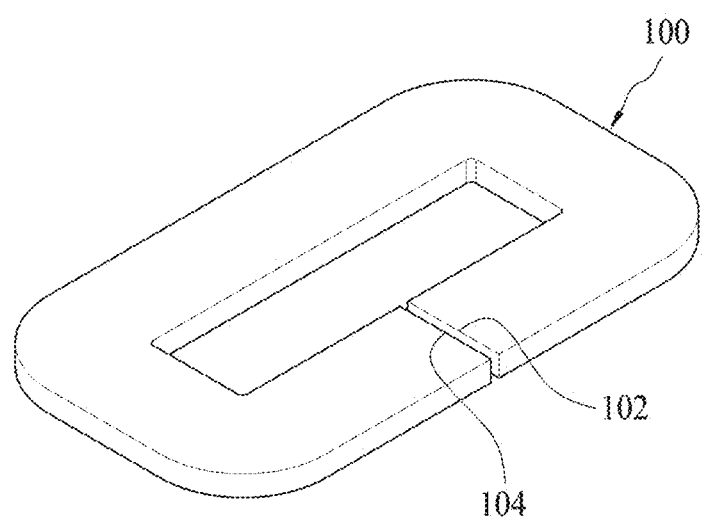
FIGS. 2 and 3 are views illustrating a pressing step according to one embodiment of the present invention.
Figure 3:
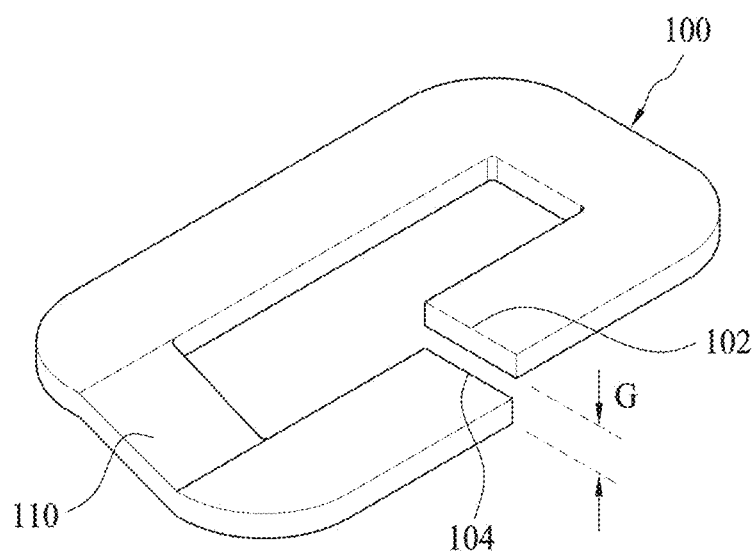

In the pressing step (S1), a bent surface 110 is formed on a part of a unit coil layers 100 in a ring shape, both ends 102, 104 of which face each other as shown in FIG. 2, thereby endowing a height difference G to both ends 102, 104 of the unit coil layer 100 as shown in FIG. 3.

Here, the unit coil layer 100 may be formed through a separate process using a forging process such as a pressing or a casting process such as a die casting.

At this time, in a case of processing cupper steel plate using a forging process, it is extremely good in regard to a production speed and also high production rate can be ensured due to a low production cost and a conductor with high density can be produced since each coil layer is under high pressure during a press process.

Even in a case of using a casting process the production rate and quality can be improved all by using multi-step process such that firstly an unit coil layer 100 is casted and then secondly the unit coil layer is pressed (compressing process) to make a dense oil structure.

Figure 4:
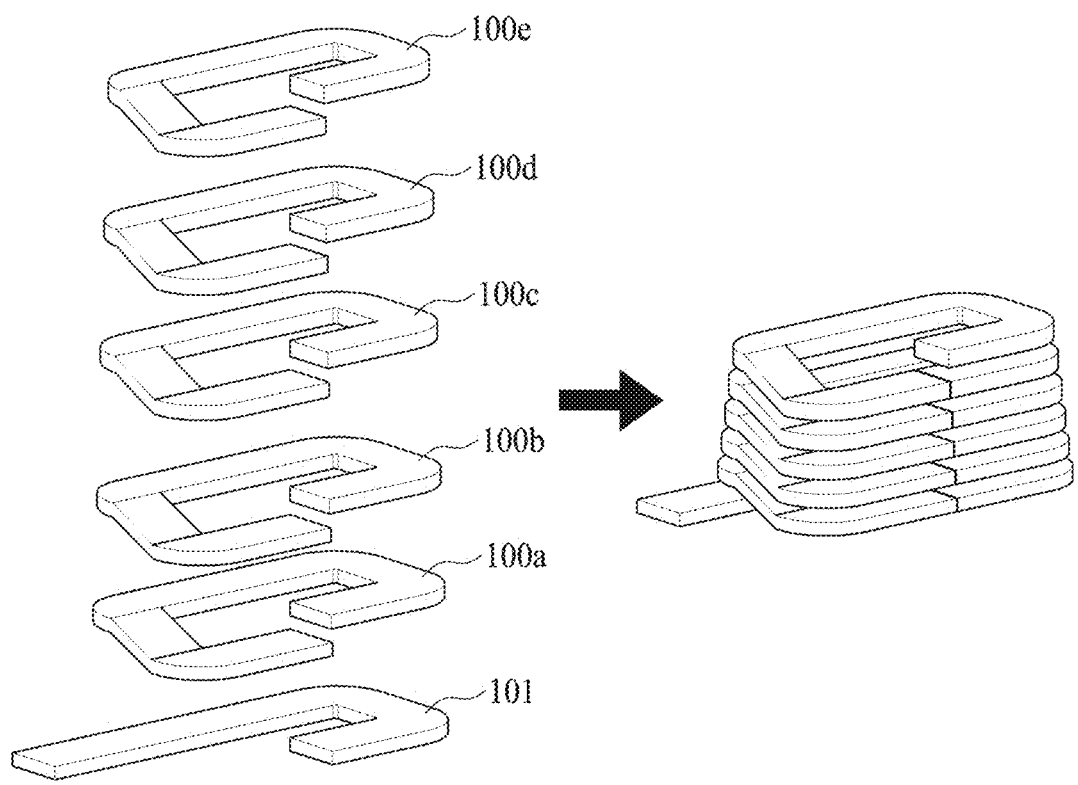
FIG. 4 is a view illustrating a fixing step according to an embodiment of the present invention.

In the fixing step (S2), as shown in FIG. 4, a plurality of unit coil layers 100a to 100e are connected and fixed to each other such that one end 102 of both ends of an unit coil layer 100a, on which a bent surface 110 is formed, is in contact with the other end 104 of both ends of another unit coil layer 100b, on which a bend surface 110 is formed.

Here, an extending portion 101 in which one end or the other end of an unit coil layer 100 extends linearly may be arranged on the uppermost end or the lowermost end of the plurality of unit coil layers 100a to 100e.

The extending portion 101 is a point where current is connected when the MOS coils are connected to a rotor or a stator and ending process is made, and it is prepared through a separate process like the unit coil layer 100 as described above.

In the bonding step (S3), the coupling portions are bonded, in which one end and the other end of each of the plurality of unit coil layers 100a to 100e, which are connected and fixed to each other through the previous fixing step (S2), are in contact each other.

At this time, the coupling portions of the plurality of unit coil layers 100a to 100e may be bonded by using various welding methods such as a resistance welding, etc. including general welding.

Particularly, in the boding step (S3) according to the embodiment of the present invention, the plurality of unit coil layers 100a to 100e may be bonded by using a resistance bonding method such that current flows therethrough while an electrode is faced to the coupling portion where one end and the other end of each of the plurality of unit coil layers 100a to 100e are in contact with each other, and thereby to make the coupling portion to be a half-molten state by using the generated resistance heat, and then pressure is applied thereto.

Meanwhile, according to the method for manufacturing an MSO coil of the present embodiment, a coupling structure forming step may be further included as the process for improving a fixing force in the fixing step (S2) between the unit coil layers 100 and a boding force between the unit coil layers 100 in the boding step (S3).

Figure 5:
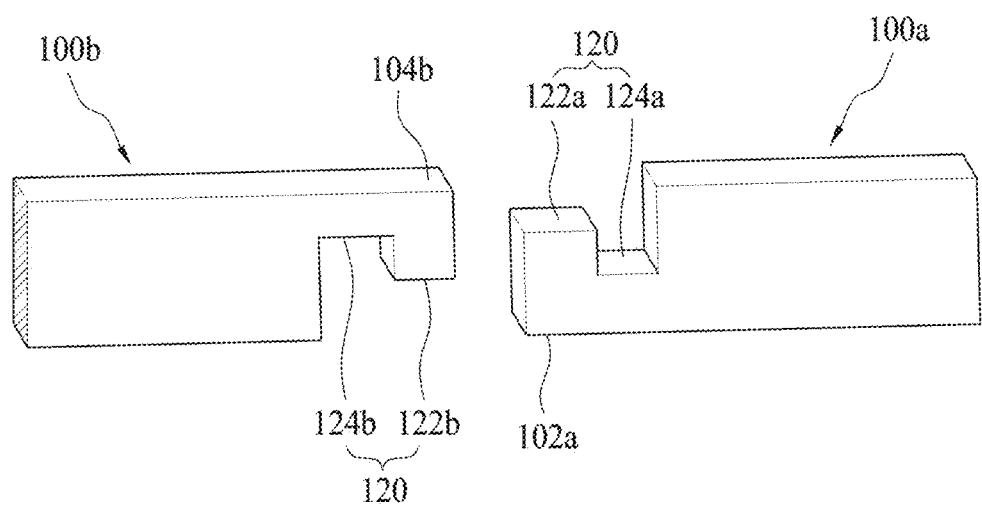
FIGS. 5 and 6 are views illustrating a coupling structure formed through a coupling structure forming step according to an embodiment of the present invention.

In the coupling structure forming step (S3), when any one unit coil layer of a plurality of unit coil layers 100a to 100e, on which the bent surface 110 is formed, is referred to as a first coil layer 100a, and another unit coil layer having the other end connected with one end of the first coil layer 100a is referred to as a second coil layer 100b (see FIG. 4), as shown in FIG. 5, the coupling structure 120 is configured by including grooves 124a, 124b and protrusions 122a, 122b which are male/female-coupled, which are provided on one end 102a of the first coil layer 100a and the other end of the second coil layer 104b, respectively, so that one end 102a of the first coil layer 100a and the other end 104b of the second coil layer 100b which is in contact with the one end 102a thereof are fitted and coupled to each other.

In more detail, in the coupling structure forming step, a first groove 124a may be formed, in which a vertical cross section of the remaining part along a longitudinal direction at one end 102a of the first coil layer other than the one part is recessed so as to form a first protrusion 122a where one part at the one end 102a of the first coil layer 100a protrudes.

Further, a second groove 124b may be formed, in which a vertical cross section of the remaining part along a longitudinal direction at the other end 104b of the second coil layer other than the one part is recessed so as to form a second protrusion 122b where one part at the other end 104b of the second coil layer 100b protrudes.

The coupling structure 120 formed through the coupling structure forming step is provided such that the first protrusion 122a at one end 102a of the first coil layer is fitted into the second groove 124b at the other end 104b of the second coil layer, and the second protrusion 122b at the other end 104b of the second coil layer is fitted into the first groove 124a at one end 102a of the first coil layer, which are corresponded with each other.

Figure 6:
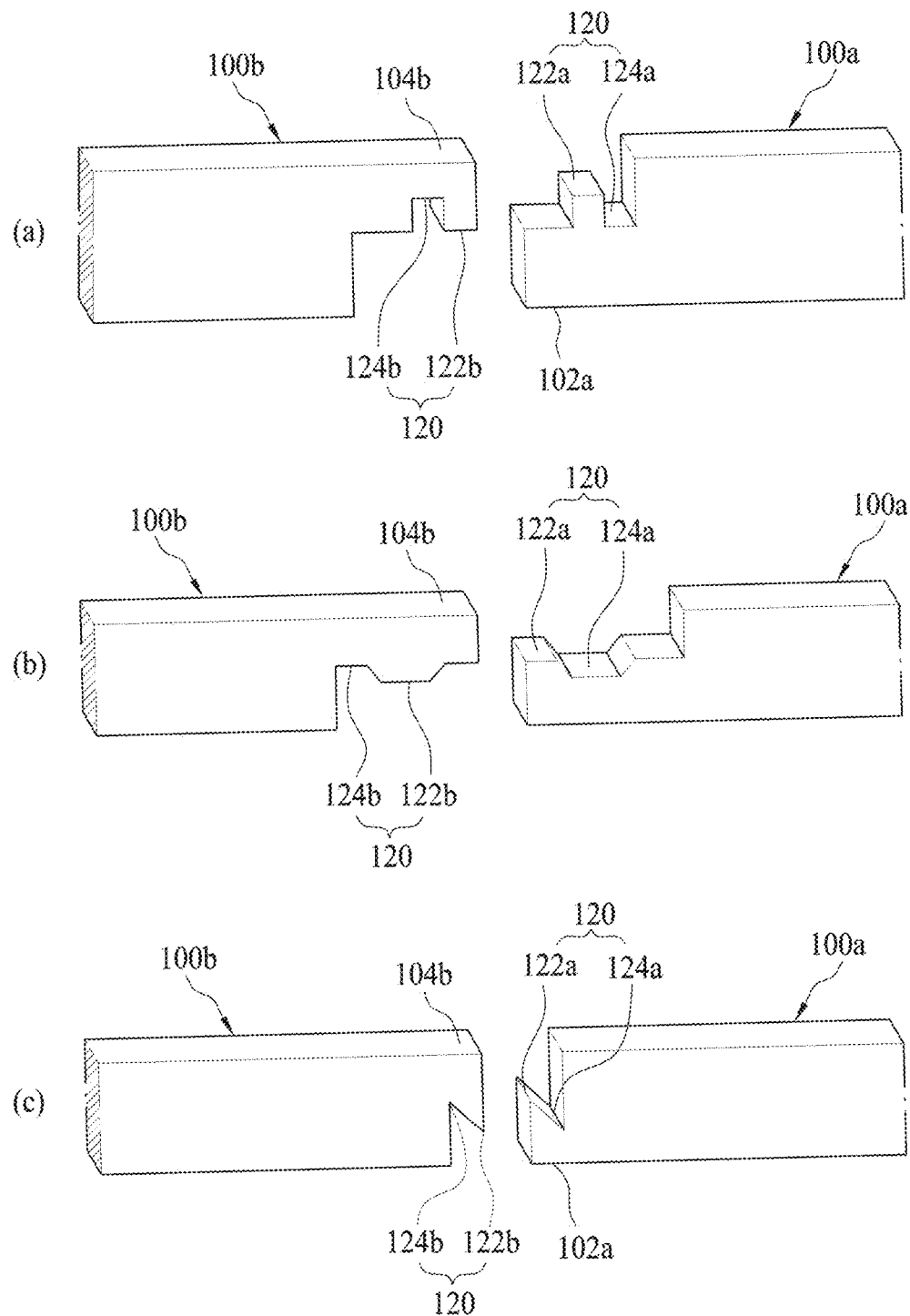

The coupling structure 120, as shown in FIG. 6, may be configured in various forms and may be varied depending on process efficiency and design benefits if the features of male/female coupling structure are included.

Figure 7:
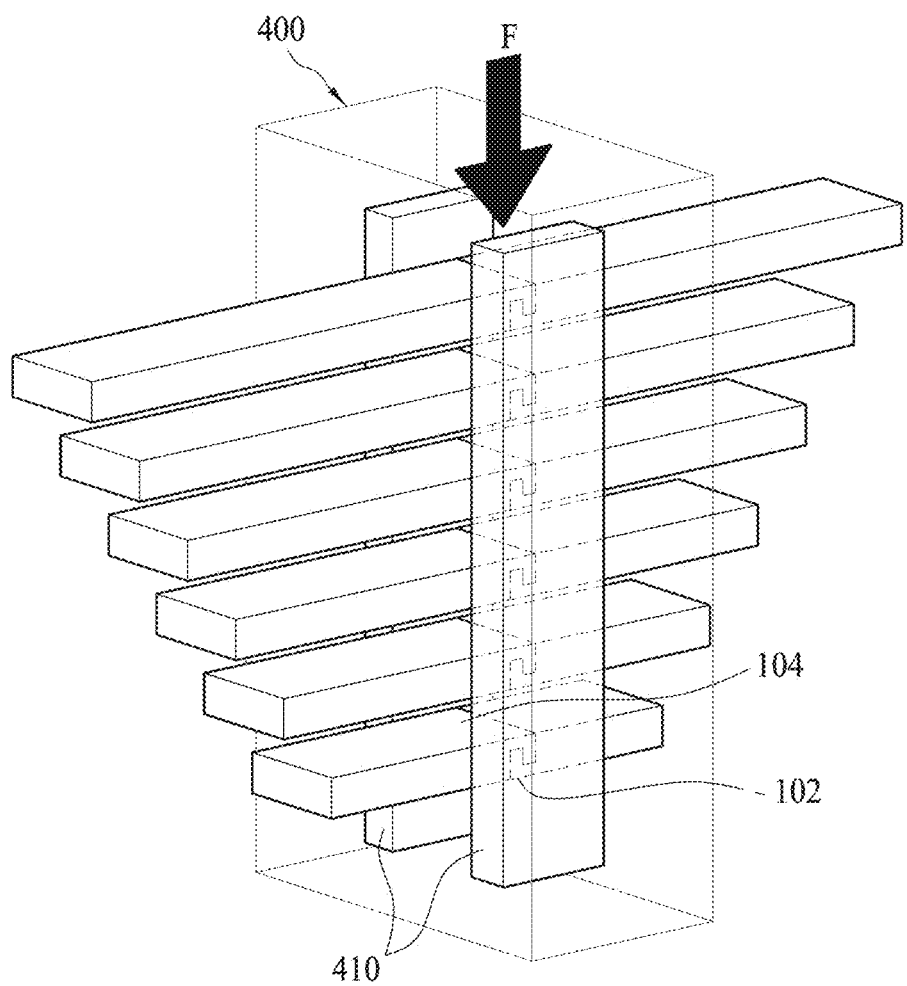
FIGS. 7 and 8 illustrate a bonding step according to an embodiment of the present invention.

According to the present embodiment, as shown in FIG. 7, in the boding step (S3), the coupling structures of the connection parts of the plurality of coil layers may be bonded to each other by facing and pressing an electrode 410 to the connection part at which one end 102a of the first coil layer 100a and the other end 104b of the second coil layer 100b are female-male coupled through the coupling structure 120, and flowing an electric current to the connection part.

The connection parts of the plurality of unit coil layers which are connected to each other through the coupling structure 120, may be bonded by making the grooves 124a, 124b and the protrusions 122a, 122b of the coupling structure 120 into a half-molten state by using a resistance heat generated when flowing an electric current to the connection part and integrally pressing the connection parts of the plurality of unit coil layers including the first coil layer 100a and the second coil layer 100b.

At this time, the connection parts of the plurality of unit coil layers may be pressed integrally by an external force, and when the direction to which the electrode 410 presses the connection parts is the width direction of the first coil layer 100a and the second coil layer 100b, the external force may press the connection parts along a thickness direction of the first coil layer 100a and the second coil layer 100b.

Figure 8:
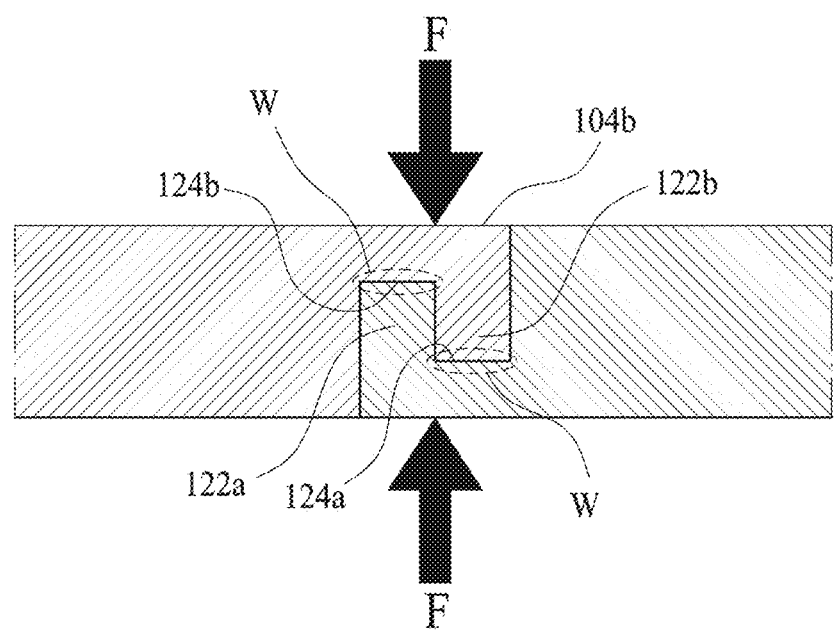

As shown in FIG. 8, in the bonding step (S3), an applying direction of an external force for pressing the connection parts is coincident with the insertion direction of the grooves 124a, 124b and the protrusions 122a, 122b having the coupling structure 120, and the protrusions 122a, 122b inserted into the grooves 124a, 124b may be preferentially melted locally and bonded, thereby minimizing the mechanical property variations of the material forming the unit coil layer 100 since a resistance welding method using a local melting is used.

Further, the connection parts of the plurality of coil layers may be welded integrally and further bid removal and post process from the welding can be minimized due to the local melting, thereby reducing the process number and improving production rate.

Meanwhile, according to another embodiment of the method for manufacturing an MSO coil of the present invention, in the coupling structure forming step, the coupling structures 120 may be formed to be misaligned each other between the plurality of coil layers.

Figure 9:
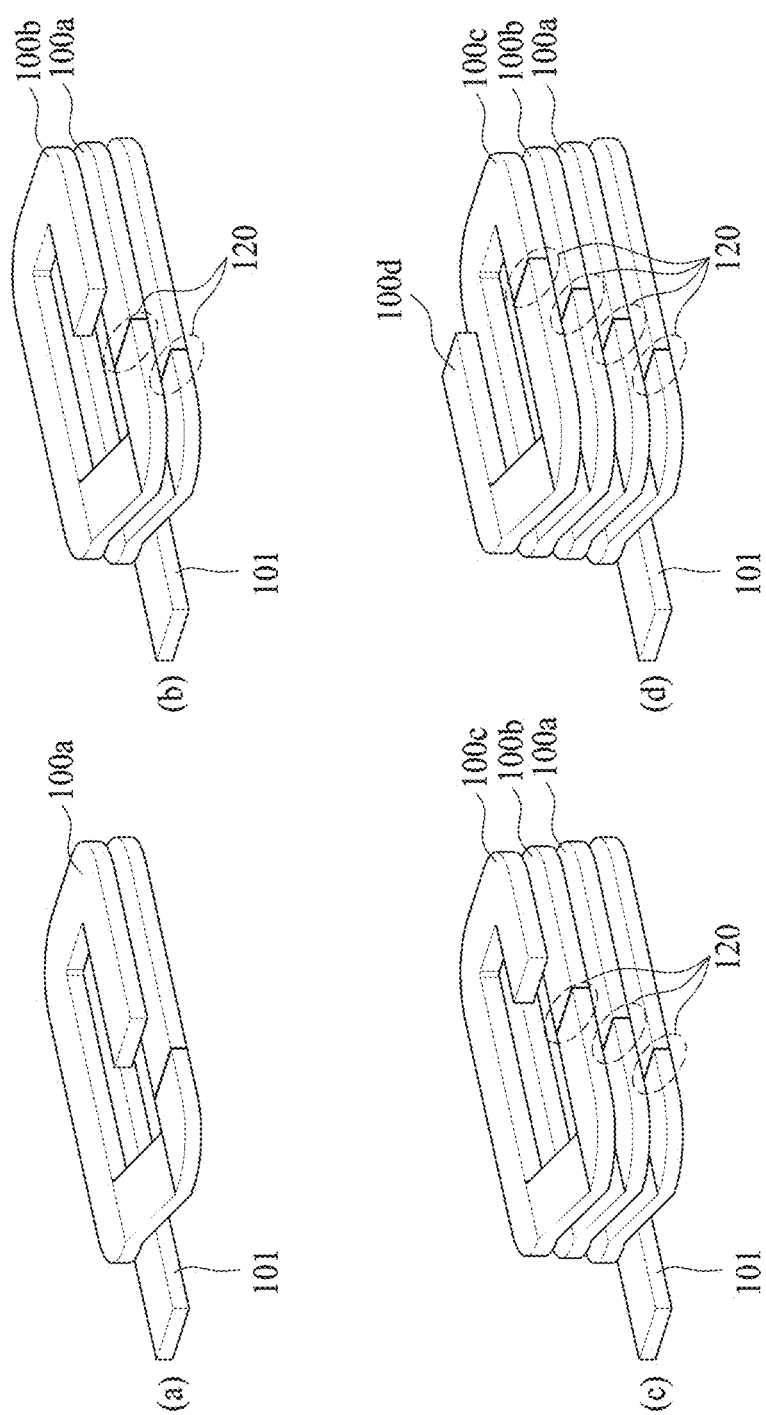
FIG. 9 is a view illustrating a fixing step according to another embodiment of the present invention.

In more detail, as shown in FIG. 9, the coupling structures 120 according to another embodiment of the present invention is configured such that when another unit coil layer having the other end connected with one end of the second coil layer 100b is referred to as a third coil layer 100c, a coupling structure 120 formed at one end of the second coil layer 100b and the other end of the third coil layer 100c, respectively, may be formed to be disposed at a position deviated from the same line as a coupling structure 120 formed at one end of the first coil layer 100a and the other end of the second coil layer 100b, respectively.

As a result, in the case where a plurality of unit coil layers are manufactured as an MSO coil, stress is applied uniformly to the coupling structures 120 arranged in the same line, that is, welding parts, hereby preventing the occurrence of continuous breakage.

In particular, when the manufactured MSO coil is coupled to a rotor or a stator, it can prevent the occurrence of continuous fracture on the coupling structure 120 due to the compressing force generated during the coupling process, and ensures sufficiently a working space from the intervals between the unit coil layers 100, which is required for post treat process.

Next, a manufacturing device used in the method for manufacturing an MSO coil as described above may include a press jig 200, a fixing jig 300, and a welding machine 400.

Figure 10:
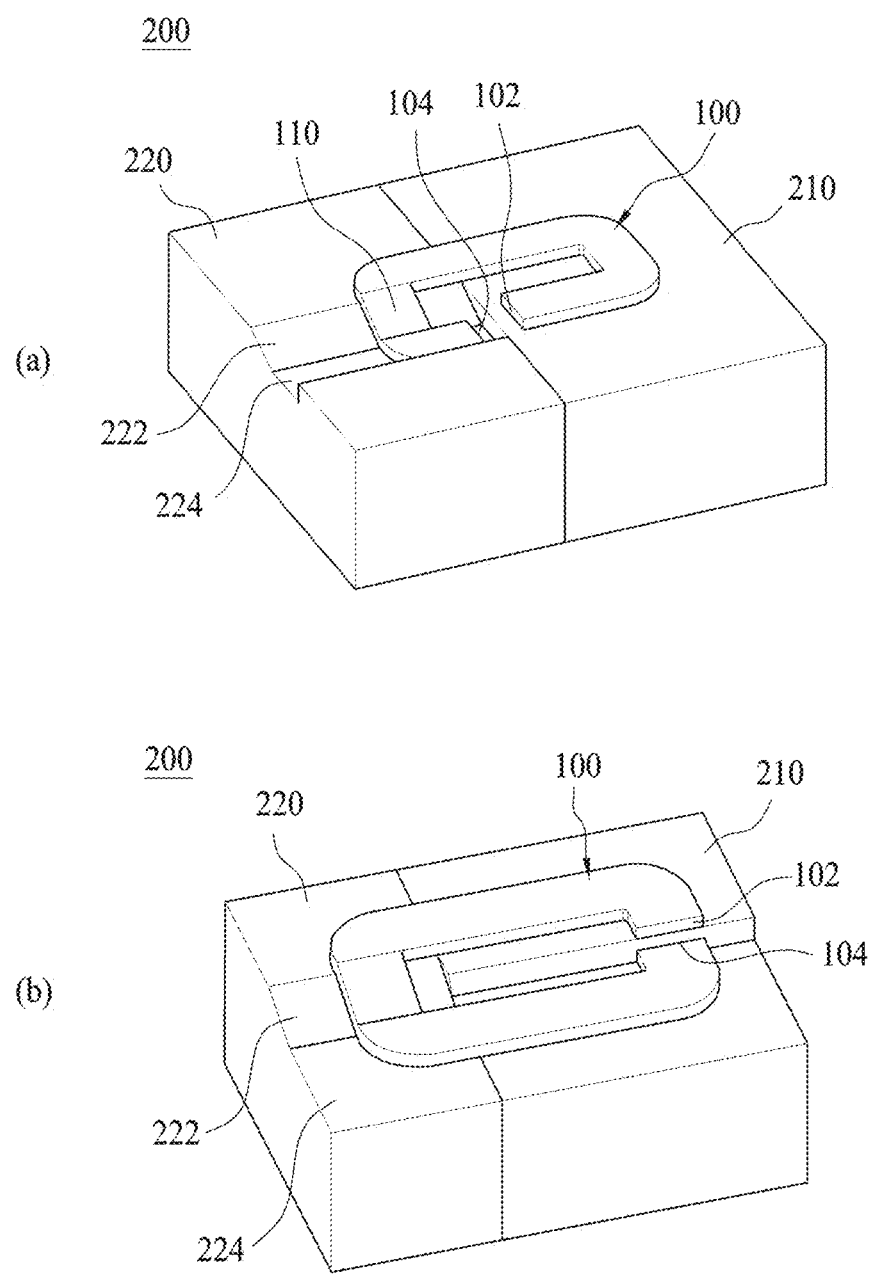
FIGS. 10 and 11 are views showing a press jig and a fixing jig in a device for manufacturing an MSO coil according to the present invention.

The press jig 200, as shown in FIG. 10, may form a bent surface 110 such that a part of one surface having a height of the unit coil layer 100, on which the bent surface 110 is to be formed, has a preset inclination and is recessed, and the bent surface 110 may be formed on a part of the unit coil layer 100 when pressure is applied to the unit coil layer 100 by an external force.

The press jig 200, as shown in FIG. 10(a), may include a first press jig 210 on which a portion including one end 102 of both ends of the unit coil layer 100 is laid and fixed and a second press jig 220 on which another portion including the other end of both ends of the unit coil layer 100 is laid and is fixed.

At this time, a slope line 222 may be provided as a groove having an inclination on the second press jig 220, which forms the bent surface 110 at a preset angle on another portion including the other end 104 of both ends of the unit coil layer 100 when pressure is applied by an external force A plane line 224 may be further provided to endow the one end 102 facing the other end 104 of the unit coil layer 100 with a height difference, which bends once more the other end 104 of the unit coil layer 100 from the bent surface 110 when pressure is applied to the unit coil layer 100 by an external force.

Meanwhile, according to the present invention, as shown FIG. 10(b), various forms and numbers of the press jig 200 may be provided to correspond to various forms depending on the arrangement positions of the corresponding unit coil layers 100 so that when a plurality of unit coil layers are coupled to each other for manufacturing an MSO coil, since the positions of one end 102 and the other end 104 of an unit coil 100 are to be different due to an arrangement position of the unit coil 100, it needs to form the bent surface 110 to correspond to various forms of the unit coil layer 110 depending on the arrangement position thereof.

Further, the first press jig 210 and the second press jig 220 may be separated from each other, so that only the first press jig 210 having a shape corresponding to various forms of the unit coil layer 100 depending on the arrangement position thereof may be replaced and used as needed.

Figure 11:
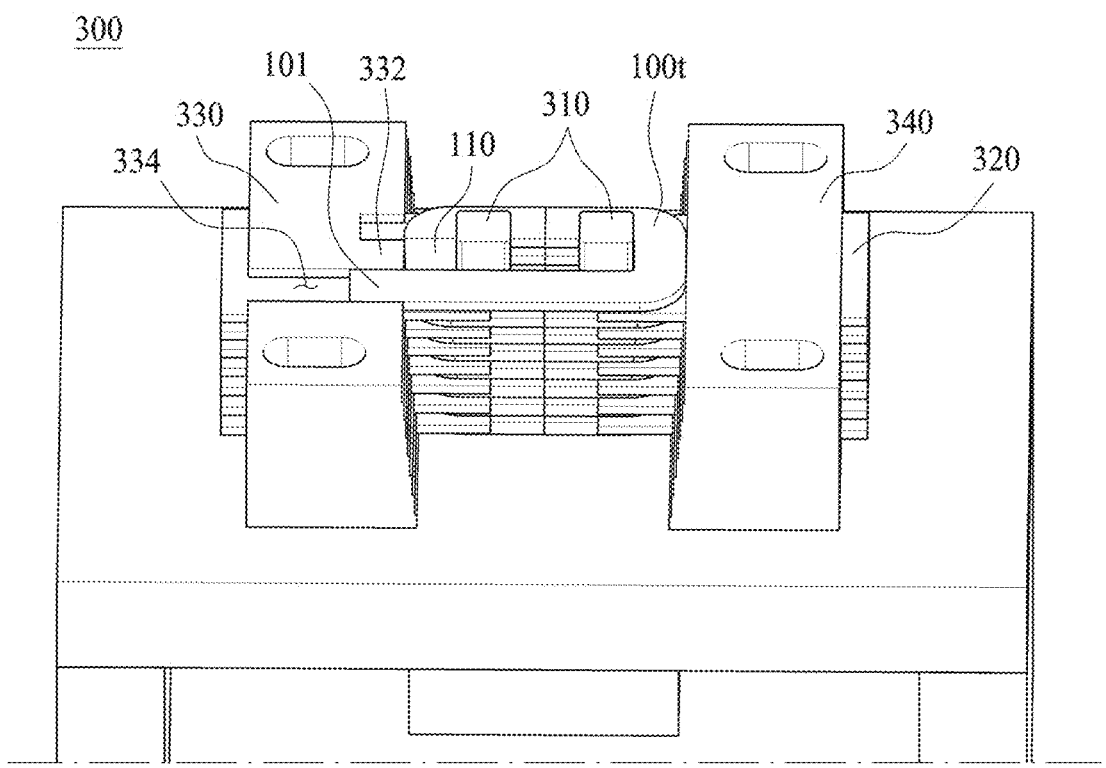

The fixing jig 300 may include a fixing pin 310, a spacer 320, a first fixing jig 330, and a second fixing jig 340 as shown in FIG. 11.

Here, the fixing pins 310 may be provided as a pair, and may be inserted into the annular unit coil layer 100 in a spaced relationship to fix a plurality of unit coil layers.

The spacer 320 has a thickness equal to the height difference between both ends of the unit coil layer 100 by the bent surface 110, and can be inserted between the plurality of unit coil layers, respectively.

The first fixing jig 330 and the second fixing jig 340 may be provided, into which one side and the other side of the spacer 320 are inserted and fixed, respectively.

Meanwhile, the first fixing jig 330 according to the present invention may include a face piece 332 for touching and fixing the bent surface 110 of the unit coil layer 100t located at the uppermost end of the plurality of unit coil layers against each other, and an end groove 334 which is formed to be open along one side of the face piece 332, into which the extension part 101 formed by linearly extending one end or the other end of the unit coil layer 100t located at the uppermost end is inserted and fixed.

Accordingly, in the fixing step (S2) as described above, the plurality of unit coil layers may be stably fixed in the form of a coil block while one end and the other end of each of unit coil layers are connected to each other.

Further, in performing the method for manufacturing the MSO coil according to the present invention, the welding operation according to the bonding step (S3) can be performed in a state where the extension part is connected in advance, and thus the MSO coil can be produced immediately in a complete shape without a subsequent process.

Here, the extended portion 101 has already been described in the process of describing the fixing step (S2), so a detailed description thereof will be omitted.

The welding machine 400 (see FIG. 7) is configured to weld the connection parts of a plurality of unit coil layers connected and fixed to each other by the fixing jig 300, and may include the electrode 410 for touching and applying current to the connection portions (coupling structure) and a pressing means (not shown) for applying pressure to the connection parts (coupling structure).

Since the welding machine 400 has already been described in the bonding step (S3) of the MSO coil manufacturing method of the present invention like the extension portion 101, the detailed description of the construction will be omitted.

In subsequent, referring to FIGS. 12 and 13, the MSO coil manufactured by the manufacturing method and the manufacturing device according to the embodiment of the present invention will be described.

Figure 12:
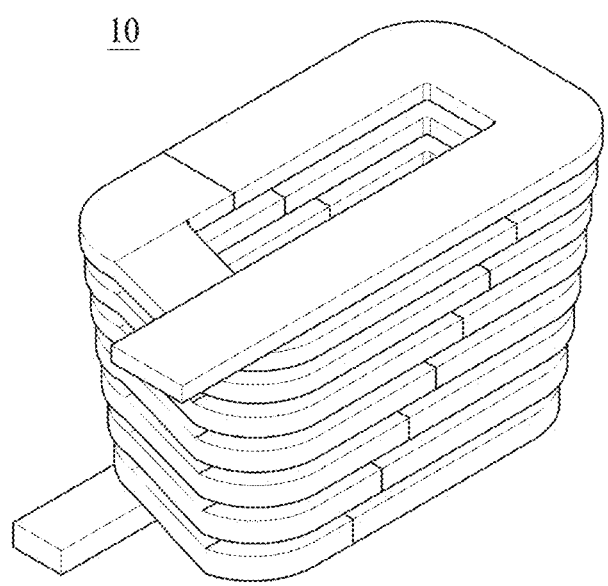
FIGS. 12 and 13 are views illustrating MSO coils manufactured by a method for manufacturing an MSO coil according to the present invention.

The MSO coil manufactured by the manufacturing method and the manufacturing device according to the present invention as described above can be constituted by a coil block in which a plurality of unit coil layers are continuously stacked along the vertical direction as shown in FIG. 12.

Since the coil block can be directly coupled to the cores of the rotor and the stator, it is easy to assemble and is excellent in the product rate, and can have a relatively high space factor as compared with the conventional circular coil.

Figure 14:
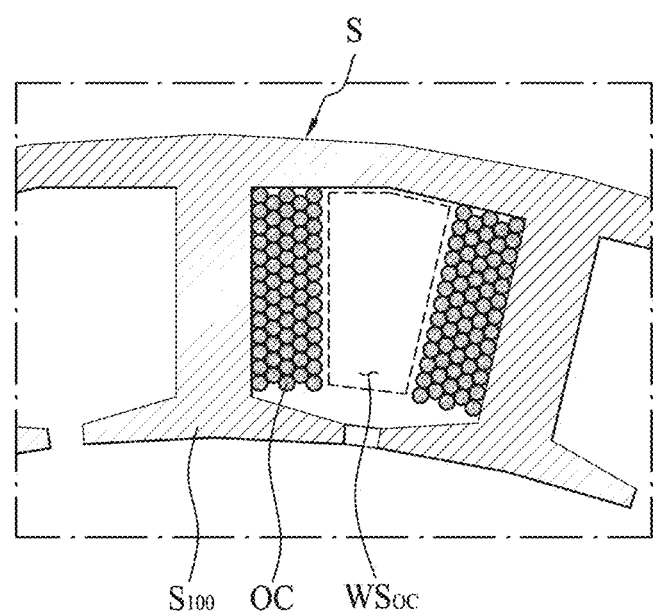
FIGS. 14 and 15 are views illustrating a waste space comparison of the prior art and the present invention.
Figure 15:
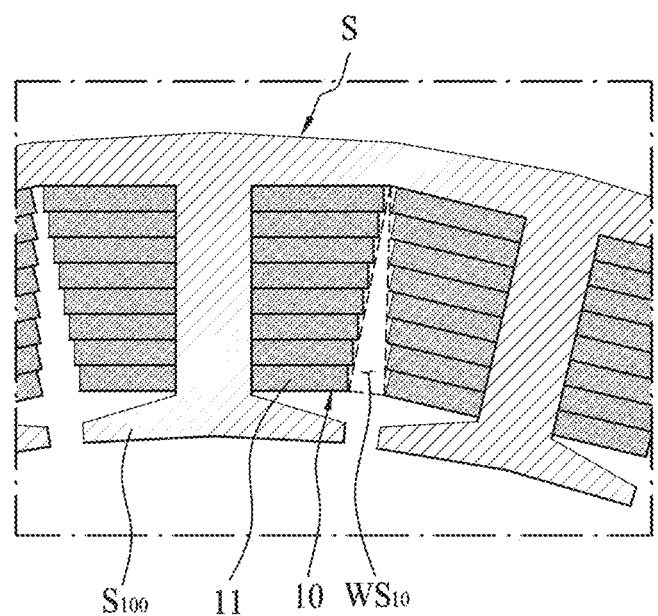

That is, as shown in FIGS. 14 and 15, when connected to the stators (S) having same structure, the waste space $WS_{10}$ generated between the MSO coils according to the present invention may be relatively smaller than the waste space $WS_{OC}$ generated when the conventional circular coil OC is wound around the core S100 of the stator S.

Further, in the case where the number of windings is increased to increase the space factor of the conventional circular coil OC, there have been problems in that the efficiency reduction and invention reduction may occur due to an increase in electric resistance occurring between the circular coils (OC). However, in the case of the MSO coil according to the present invention, even though the cross-sectional width of the coil forming the coil layer increases gradually from the lower part to the upper part, the coil layer is formed by stacking continuously a coil and thus the present invention can be relatively free from the above problems.

Figure 13:
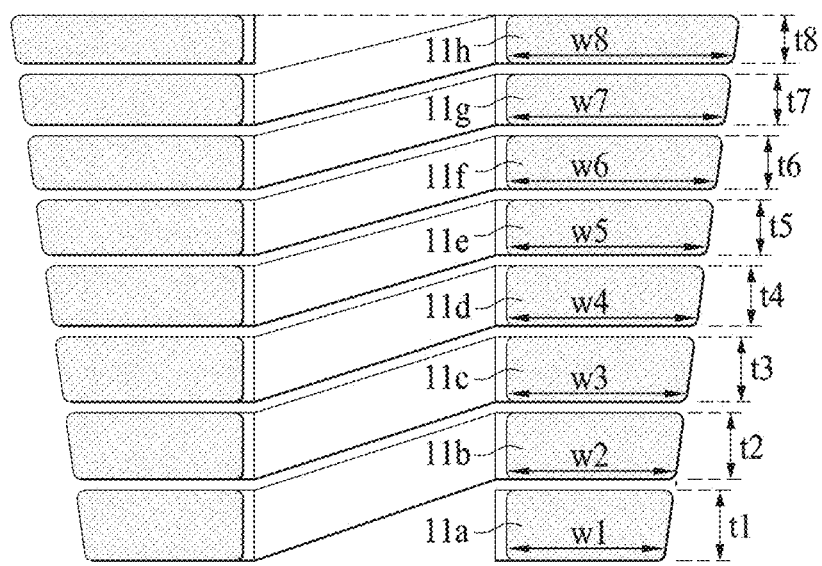

In addition, in the MSO coil manufactured by a manufacturing method and a device according to the present invention, as shown in FIG. 13, the width of the vertical cross section of the unit coil layer increases from the lower portion to the upper portion of the coil block 10 and the thickness thereof decreases so that the plurality of unit coil layers may have the same vertical cross-sectional area along the vertical direction.

More specifically, assuming that the coil located at the lowermost portion of the plurality of coil layers is a first coil 11a and the coil located immediately above the first coil is a second coil 11b, the width w2 of the second coil may be relatively wider than the width w1 of the first coil and the thickness t2 may be formed to be relatively thinner than the thickness t1 of the first coil.

In the same manner, assuming that the coil located immediately above the second coil 11b is a third coil 11c, the width w3 and the thickness t3 of the third coil may be relatively wider and thinner than the width w2 and the thickness t2 of the second coil 11b, respectively.

That is, when the coil block 10 is formed with eight coil layers, the eighth coil 11h located at the uppermost portion of the coil block 10 may be formed with a relatively much wider width w8 and a thinner thickness t8 than the first coil 11a located at the lowermost portion of the coil block 10, and in the case of the second coil 11b to the seventh coil 11g located between the first coil 11a and the eighth coil 11h, as the coils are located at the upper portion, they may have gradually wider width and thinner thickness.

As described above, all the vertical cross-sectional areas along the vertical direction of the plurality of coil layers forming the coil block 10 may be formed to be the same, thereby enabling the production of the MSO coil in which electric resistance loaded to each coil layer is uniform.

This means that electric motors and generators with low heat generation and high efficiency can be produced, and thus electric motors and generators with relatively good efficiency in low-speed and high-torque operating sections can be produced by applying the MSO coil according to the present invention.

In particular, when the MSO coil is used to a motor with low actual rotation numbers or small pole numbers, better efficiency can be expected, and when the MSO coil is used in the electric vehicle motor field where efficiency properties are very important at low speeds, it can bring significant increases in the energy efficiency compared to conventional coils.

While the present invention has been described with respect to the specific embodiments, it will be apparent to those skilled in the art that the present invention may be embodied in other specific forms in addition to the embodies described above without departing from the purpose or scope of the present invention.

Therefore, the above described embodiments should be regarded as illustrative rather than restrictive, and therefore, the present invention is not limited to the above description, and may be modified within the scope and the equivalent range of the appended claims.

The invention claimed is:

1. A method for manufacturing a Maximum Slot Occupy (MSO) coil, comprising:
a pressing step of forming a bent surface on a part of a unit coil layer, which has a ring shape such that both ends thereof face each other, thereby endowing both ends of the unit coil layer with a height difference;
a fixing step of connecting and fixing a plurality of unit coil layers to each other, each unit coil layer having a bent surface formed thereon, such that one end of both ends of a unit coil layer having the bent surface formed thereon contacts the other end of both ends of another unit coil layer having the bent surface formed thereon;

a bonding step of bonding connection parts where one end and the other end of each of the plurality of unit coil layers that are connected and fixed to each other are in contact, and a coupling structure forming step wherein when any one unit coil layer of the plurality of unit coil layers, on which the bent surface is formed, is referred to as a first coil layer, and another unit coil layer having the other end connected with one end of the first coil layer is referred to as a second coil layer, the coupling structure is configured by including grooves and protrusions which are male/female-coupled, which are provided on one end of the first coil layer and the other end of the second coil layer, respectively so that the connection parts where one end of the first coil layer and the other end of the second coil layer are in contact are fitted and coupled to each other, wherein in the bonding step, connection parts of the plurality of unit coil layers connected to each other through the coupling structure are bonded by making the grooves and the protrusions of the coupling structure into a half-molten state by using a resistance heat generated when flowing an electric current to the connection parts and integrally pressing the connection parts of the plurality of unit coil layers including the first coil layer and the second coil layer.

2. The method for manufacturing an MSO coil according to claim 1, the coupling structure forming step comprises: forming a first groove in which a vertical cross section of the remaining part along a longitudinal direction at one end of the first coil layer other than the one part is recessed so as to form a first protrusion where one part at the one end of the first coil layer protrudes; and forming a second groove in which a vertical cross section of the remaining part along a longitudinal direction at the other end of the second coil layer other than the one part is recessed so as to form a second protrusion where one part at the other end of the second coil layer protrudes, wherein the coupling structure is provided such that the first protrusion at one end of the first coil layer is fitted into the second groove at the other end of the second coil layer, and the second protrusion at the other end of the second coil layer is fitted into the first groove at one end of the first coil layer, which are corresponding with each other.

3. The method for manufacturing an MSO coil according to claim 1, wherein in the coupling structure forming step when another unit coil layer having the other end connected with one end of the second coil layer is referred to as a third coil layer, a coupling structure formed at one end of the second coil layer and the other end of the third coil layer, respectively, is formed to be disposed at a position deviated from the same line as a coupling structure formed at one end of the first coil layer and the other end of the second coil layer, respectively.

4. The method for manufacturing an MSO coil according to claim 1, wherein in the bonding step, the coupling structures of the first coil layer and the second coil layer are bonded to each other by facing and pressing an electrode to the connection part at which one end of the first coil layer and the other end of the second coil layer are female and male coupled through the coupling structure, and flowing the electric current to the connection part.

5. The method for manufacturing an MSO coil according to claim 1, wherein in the bonding step, the electrode presses a width direction of connection parts of the first coil layer and the second coil layer, and presses a thickness direction of the connection parts by applying an external force when flowing the electric current to the connection parts through the electrode.

6. The method for manufacturing an MSO coil according to claim 5, wherein in the bonding step, an applying direction of the external force for pressing the connection parts is coincident with the insertion direction of the groove and the protrusion having the coupling structure, and the protrusion inserted into the groove by the external force applied to the connection parts is preferentially melted locally and bonded.

7. A device for manufacturing a Maximum Slot Occupy (MSO) coil comprising:

a press jig having a surface on which the unit coil layer is placed, a part of the surface being recessed to have a preset inclination to correspond to a part of the unit coil layer, on which the bent surface is to be formed, such that, when pressure is applied to the unit coil layer by external force, a bent surface is formed on the part of the unit coil layer;

a fixing jig inserted between the plurality of unit coil layers, respectively, so as to support the plurality of unit coil layers such that the plurality of unit coil layers, each unit coil layer having the bent surface formed thereon, can be connected to each other at an interval corresponding to the inclination of the bent surface; and a welding machine for welding connection parts where one end and the other end of each of the plurality of unit coil layers are connected and fixed to each other by the fixing jig, wherein the press jig comprises a first press jig on which a part including one end of both ends of the unit coil layer is laid and fixed and a second press jig on which another part including the other end of both ends of the unit coil layer is laid and fixed, wherein the second press jig comprises: a slope line provided as a groove having an inclination and forming a bent surface at a predetermined angle at another part including the other end of both ends of the unit coil layer when a pressure is applied to the unit coil layer by an external force; and a plane line of bending the other end of the unit coil layer from the bent surface once more when a pressure is applied to the unit coil layer by an external force so that the other end of the unit coil layer has a height difference from, but is parallel to the one end of the unit coil layer.

8. The device for manufacturing the MSO coil according to claim 7, wherein the fixing jig comprises:

a fixing pin that is provided as a pair and is inserted into the annular unit coil layer in a spaced relationship to fix the unit coil layer;

a plurality of spacers inserted between the plurality of unit coil layers, respectively, each of the plurality of spacers having a thickness equal to the height difference between both ends of the unit coil layer by the bent surfaces;

a first fixing jig to which one side of the plurality of spacers is inserted and fixed; and a second fixing jig to which the other side of the plurality of spacers is inserted and fixed.

9. The device for manufacturing the MSO coil according to claim 8, wherein the first fixing jig comprises:

a face piece for touching and fixing the bent surface of the uppermost unit coil layer of the plurality of unit coil layers; and an end groove which is opened along one side of the face piece, into which an extending portion formed by extending one end or the other end of the unit coil layer located at the uppermost unit coil layer of the plurality of unit coil layers in a straight line shape, is inserted and fixed.

10. A Maximum Slot Occupy (MSO) coil manufactured by a method for manufacturing an MSO coil according to claim 1, wherein the MSO coil forms a coil block in which the plurality of unit coil layers are continuously stacked along a vertical direction, and the coil block is configured such that a width of a vertical cross section of the unit coil layer increases and a thickness thereof decreases as going from the lower part to the upper part, and thus all the vertical cross-sectional areas along the vertical direction of the plurality of unit coil layers are formed identically.

11. A Maximum Slot Occupy (MSO) coil comprising:

a coil block in which a plurality of unit coil layers are continuously stacked along a vertical direction, wherein the coil block is configured such that a width of a vertical cross section of the unit coil layer increases and a thickness thereof decreases as going from the lowest unit coil layer to the highest unit coil layer, and thus all the vertical cross-sectional areas along the vertical direction of the plurality of unit coil layers are formed identically.

\* \* \* \* \*